United States Patent [19]

Weadon

[11] Patent Number: 4,912,854
[45] Date of Patent: Apr. 3, 1990

[54] CROSS VIAL LIQUID BUBBLE ILLUMINATED LEVEL

[76] Inventor: Joseph P. Weadon, 4303 Earline Ave., Columbus, Ga. 31904

[21] Appl. No.: 259,589

[22] Filed: Oct. 19, 1988

[51] Int. Cl.4 .......................... G01C 9/26; G01C 9/32; G01C 9/34
[52] U.S. Cl. ..................................... 33/348.2; 33/379; 33/381; 33/382; 33/390
[58] Field of Search ...................... 33/348.2, 379, 381, 33/382, 390

[56] References Cited

U.S. PATENT DOCUMENTS

| | | | |
|---|---|---|---|
| 456,086 | 7/1891 | Forwood | 33/390 |
| 765,321 | 7/1904 | Potter | 33/379 |
| 794,753 | 7/1905 | Stetson | 33/348.2 |
| 948,570 | 2/1910 | Andersen | 33/348.2 |
| 1,204,768 | 11/1961 | Hommel | 33/390 |
| 1,566,541 | 12/1925 | Kirby | 33/348.2 |
| 2,344,241 | 3/1944 | Flint | 33/348.2 |
| 2,607,882 | 8/1952 | Arnold | 33/348.2 |
| 2,615,122 | 10/1952 | Coombs | 33/348.2 |
| 2,790,069 | 4/1957 | Alexander | 33/348.2 |
| 2,806,133 | 9/1957 | Aube | 33/348.26 |
| 2,944,144 | 7/1960 | Naylor | 33/348.2 |
| 3,003,054 | 10/1961 | Hubbard | 33/348.2 |
| 3,188,748 | 6/1965 | Moody | 33/390 |
| 3,192,375 | 6/1965 | Olson | 33/348.2 |
| 3,584,212 | 6/1971 | Hansen | 33/348.2 |
| 3,968,584 | 7/1976 | Kingston | 362/812 |
| 4,201,005 | 5/1980 | Hunt | 362/812 |
| 4,407,075 | 10/1983 | MacDermott et al. | 33/348.2 |
| 4,654,977 | 4/1987 | Pakus | 33/366 |

FOREIGN PATENT DOCUMENTS

| | | | |
|---|---|---|---|
| 530981 | 8/1954 | Belgium | 33/348.2 |
| 2754030 | 6/1979 | Fed. Rep. of Germany | 33/348.2 |
| 1080534 | 6/1954 | France | 33/348.2 |
| 55-36736 | 3/1980 | Japan | 33/381 |
| 149741 | 9/1931 | Switzerland | 33/390 |
| 2182146 | 5/1987 | United Kingdom | 33/379 |

Primary Examiner—Allan N. Shoap
Assistant Examiner—Diego F. F. Gutierrez
Attorney, Agent, or Firm—A. Robert Theibault

[57] ABSTRACT

The liquid indicating leveling device consists of a modular unit having four walls each at 90° to one another, the inside surfaces of the walls having a flat non-reflective white surface together with a white back wall and having an open viewing front defining a viewing chamber. The bubble vial is disposed in the viewing chamber parallel to the bottom wall of the viewing chamber so that the vial may be viewed through the open front for both vertical and horizontal leveling. Illumination is provided for selectively maintaining the light level within the viewing chamber at a level sufficiently above ambient for taking a bubble reading without glare or reflections from outside elements. A beam is provided in which the modular unit is mounted to increase the accuracy of the unit over a greater length for more accurate readings. A cross bubble device is provided for taking both vertical and horizontal readings. The beam into which the modular unit is mounted for measuring the level of a plane having a length greater than the length of the modular unit.

3 Claims, 3 Drawing Sheets

CROSS VIAL LIQUID BUBBLE ILLUMINATED LEVEL

TECHNICAL FIELD

My invention relates to liquid bubble vial levels illuminated by replaceable batteries and lamps having modular vial units with alignment means for proper right angle alignment with the level plane with which the liquid bubble units are installed. The liquid bubble levels are of the cross-vial type wherein the cross vial is disposed on a plane and the vial has two rings between which the bubble lies when the vial is on a level plane and wherein the level plane on which the vial is mounted may be of I-beam, channel or box construction so long as the vial is within an illuminated white walled non-reflective viewing chamber having a single viewing opening through which the bubble between the two rings may be observed.

My precision molded vial unit, may well be used in open port hole type (un-lit) levels.

The primary importance of my invention resides in the molded vial holder and vial being made in one piece with illumination being secondary.

BACKGROUND ART

Prior patents for spirit levels, lighted or unlighted are as follows:

All levels including the following U.S. Pat. Nos. 4,685,219, 3,738,015, 794,753 and 94850, disclose a method of securing a bubble vial in a wood or metal beam with natural light for reading of the vial provided by a port hole type aperture.

U.S. Pat. Nos. 794,753, 948,570, 1,566,541, 2,607,882, 2,806,133 and 4,407,075 are illuminated levels which use various batteries, bulbs and wires to light up, reflect, direct or bounce the light off the bubble vials that are secured in a beam that is described previously.

No provision is made for easy manufacture, installation or quick servicing of the lighted devices.

U.S. Pat. No. 4,654,977 shows an electronic level that has no liquid bubble vial.

DISCLOSURE OF THE INVENTION

In accordance with my invention I provide level beams of either I, channel or box cross section with spirit level vials to indicate the attitude of the plane of the level beam.

This invention is a complete unit consisting of at least one (1) single cross bubble tubular vial or a pair of vials which may be molded together crossing at their center at an exact 90° angle to each other to form a one piece cross shaped vial with annular rings, to contain the bubble liquid to show a level reading on the horizontal bubble in either vial when the other vial is in the vertical position. Microscopic tolerances are maintained to form a perfect square inside and out a lighted viewing chamber in which the vial module is secured and which has a lighted white viewing chamber molded to microscopic tolerances on all inside and outside planes.

An object of this invention is to provide craftsmen such as wallpaper hangers, carpenters, cabinet makers, machinery and equipment installers, etc., with a device that will allow accurate readings of a crossed shaped liquid bubble vial for use in all situations when working in both lighted and unlighted areas without outside distractions external of the viewing chamber.

This invention is designed for, but not limited to, use indoors.

A further object of this invention is to provide a horizontal and vertical vial combined in one unit to contain a liquid material that will show a level reading at all viewing openings horizontally or vertically automatically. No bubble vial will be inactive at any position in which a level having more than one viewing vial is used.

Further, present levels on the market only furnish a port hole type aperture passing entirely through the level to view the bubble in the vial. I have found that wallpaper hangers working over multicolored flower and stripped wallpaper have difficulty getting an accurate reading due to the distraction caused by outside elements and seen through these port holes. Other craftsmen have trouble with trees, leaves, shrubbery, bricks, wood grain, etc. I propose to eliminate these problems by providing a well lighted, solid white viewing chamber having a single viewing opening for the crossed liquid bubble vial that is mounted in its own separately molded unit complete with a clear view single aperture cover placed over the flat white walled viewing chamber and secured with four (4) easy to remove screws for servicing.

This makes a complete precision made cross vial instrument which may be read quickly and accurately in any position without glare or distraction by outside elements.

When reading my level by natural light, the bubble vial being against a white background of the viewing chamber may readily be seen. When encountering dim or dark areas, a simple flip of the switch and the entire viewing chamber lights up, making fast accurate readings easy, quick and positive.

In as much as I simply place the bubble vial module in a well lighted white viewing chamber and make no attempt to light up, reflect, direct rays at, or bounce light off the liquid bubble vial, I feel this invention introduces a distinctly different approach in illuminating a spirit level.

My invention may be easily attached to many types of frames to lengthen the working plane. Regardless of the length of the frame, only one cross vial bubble unit is necessary to obtain an accurate reading horizontally or vertically, however, two (2) or even three (3) units may be used if desired.

BEST MODE FOR CARRING OUT THE INVENTION

Figure 1:
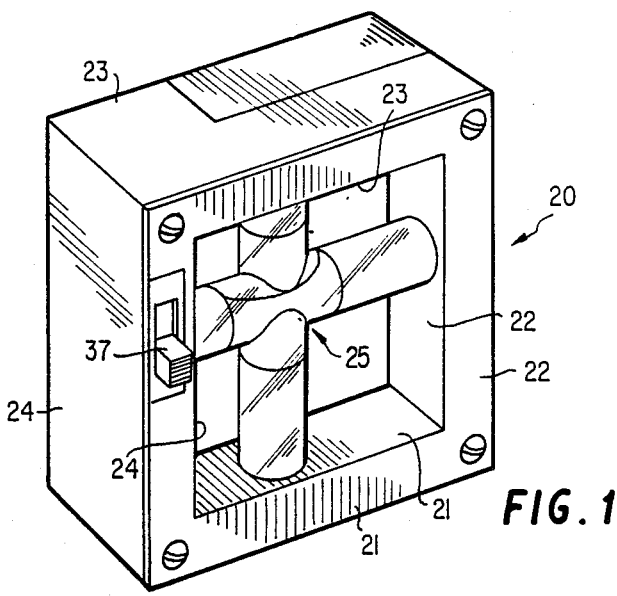
FIG. 1 is a perspective view of an improved illuminated liquid level bubble modular unit for use with a level.
Figure 2:
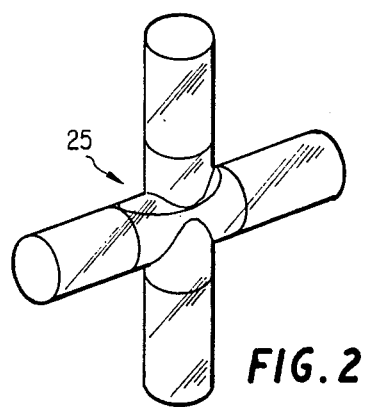
FIG. 2 is a cross vial liquid bubble level unit for use with the level of FIG. 1.
Figure 3:
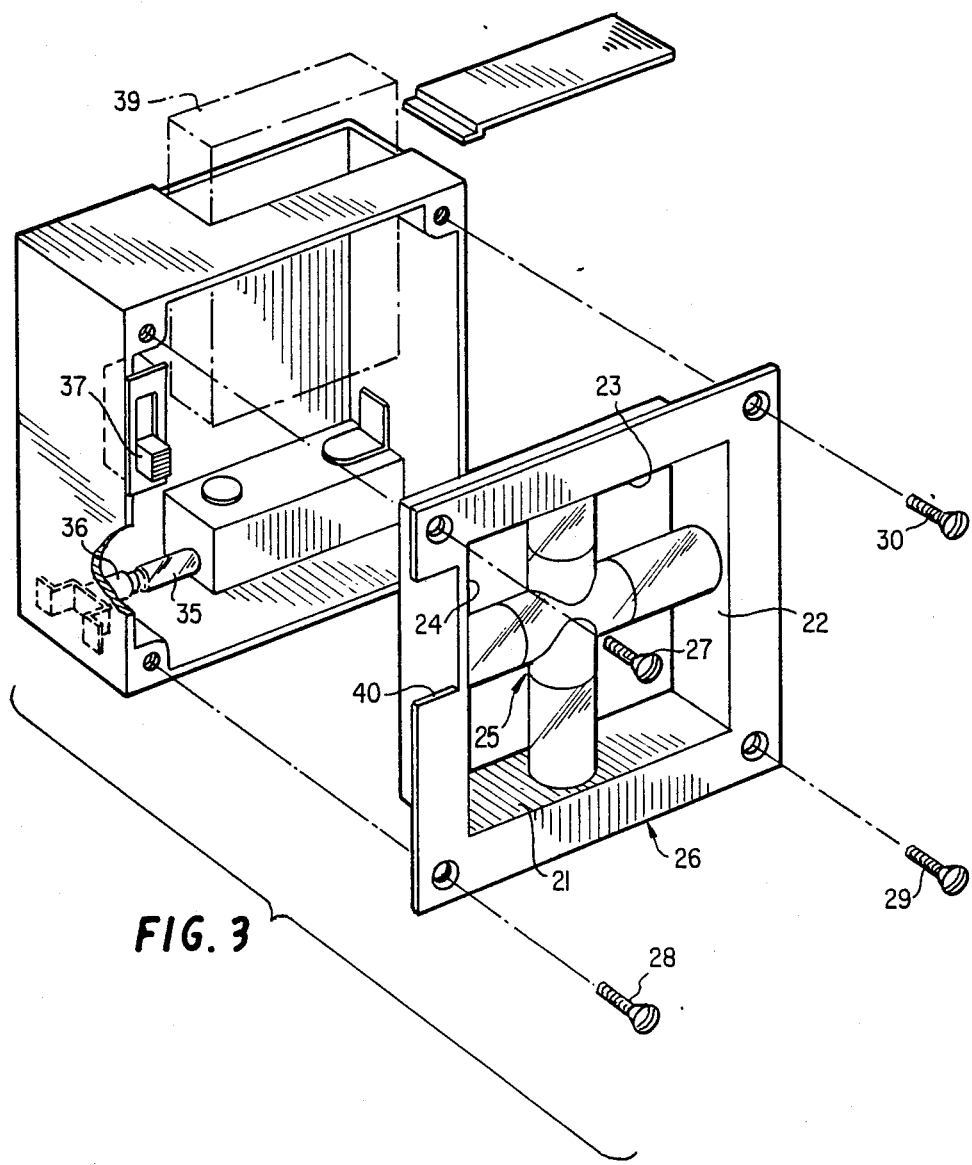
FIG. 3 is an exploded perspective view of the illuminated modular unit of FIG. 1.

Referring for the moment to FIGS. 1 through 3 the basic modular level unit 20 is shown having a viewing chamber in which all sides 21, 22, 23 and 24 have walls which are painted with a flat non reflective white paint and which house a cross vial cv shown in FIG. 2. The walls 21, 22, 23 and 24 are all flat and at precisely 90° to each other to permit use of the unit 20 for leveling either vertically or horizontally and which may be used with or without a level beam.

The level unit 20 of FIGS. 1 and 3 has a front viewing cover 26 which is secured to the unit 20 by screws 27, 28, 29 and 30 passing through threaded corner tabs 31, 32, 33 and 34. This unit 26 may be used separately from the lighted chamber.

As best seen in FIGS. 3, 6, 7 and 7A the interior of the level unit 20 houses a lamp 35 receivable in a threaded lamp holder 36 in electrical circuit with a switch 37 through plug 38 to supply energy from an Eveready Energizer #539, Size J, 6 volt battery 39. The front cover of the level unit 20 is notched out at 40 to accommodate the switch 37 for energizing the lamp 35 to indirectly illuminate the bubble viewing chamber of the unit 20 for obtaining an accurate level reading.

Figure 4:
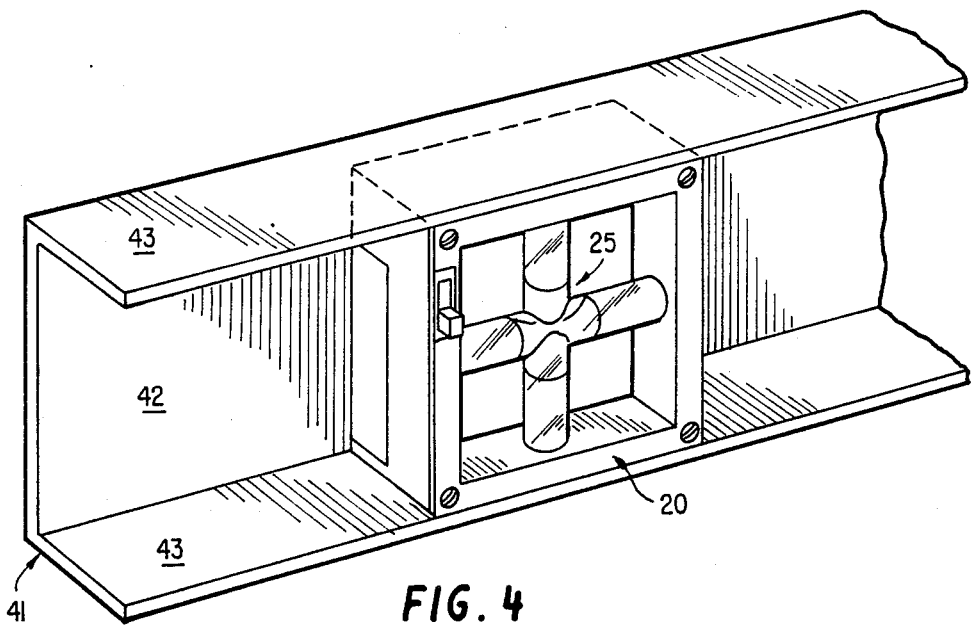
FIG. 4 is a perspective view of the illuminated modular unit of FIG. 1 applied to a channel cross-section level.
Figure 5:
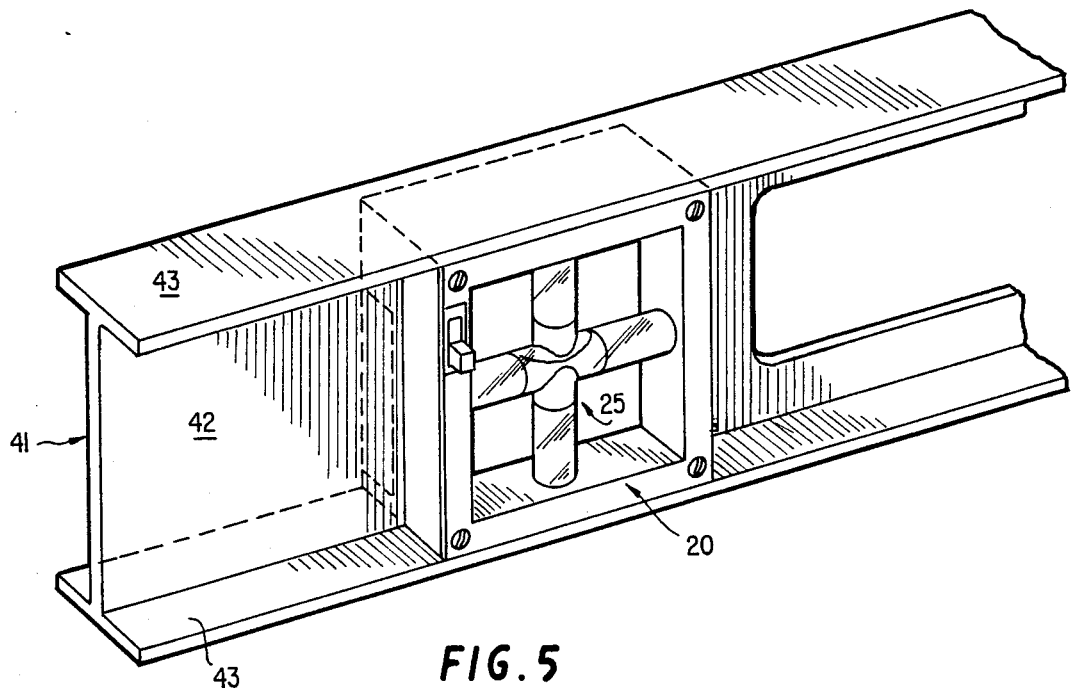
FIG. 5 is an exploded perspective view of the illuminated modular unit of FIG. 1 applied to an I-beam cross section level having a base mount board and an outer external electrically conductive mount board and cover.
Figure 6:
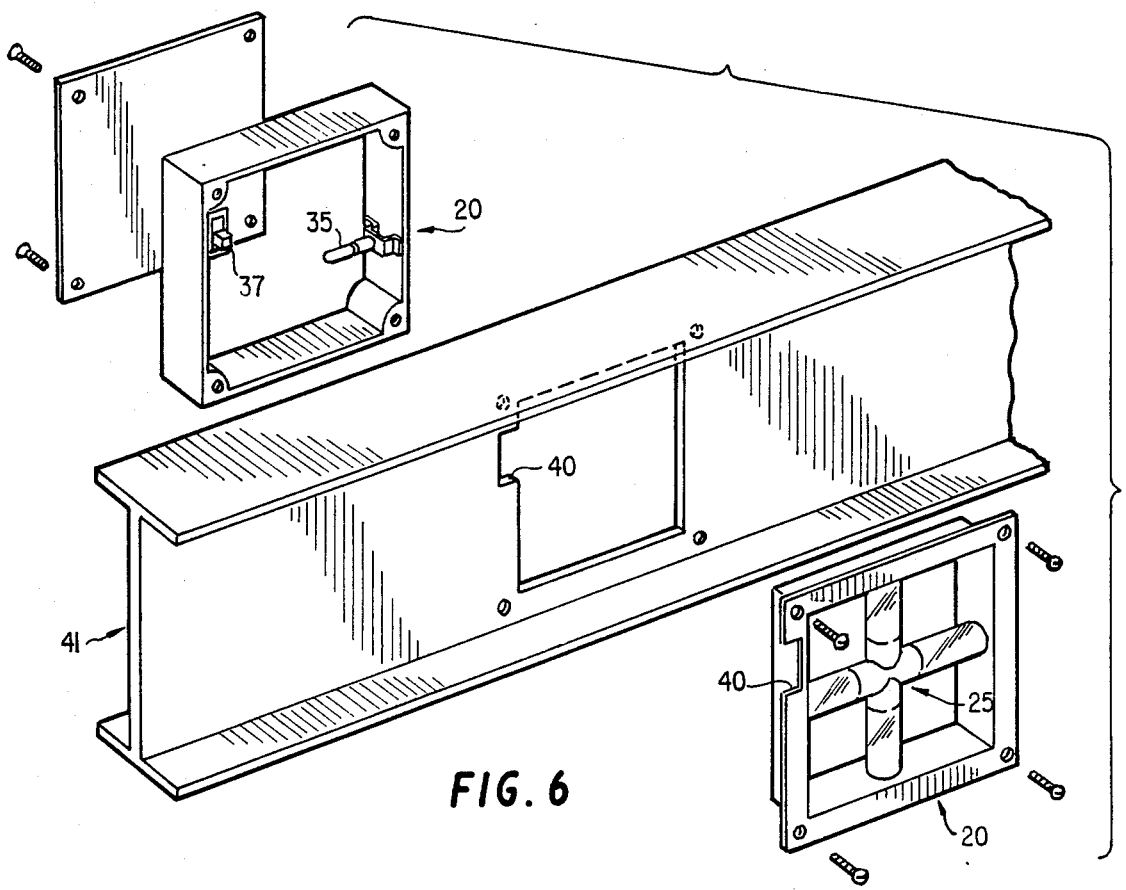
FIG. 6 is an exploded perspective view of an I-beam level with the web cut out to receive an improved modular battery powered illumination unit similar to FIG. 5.
Figure 7A:
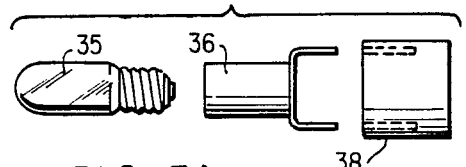
FIG. 7A is a fragmentary view of the lamp screw in bulb and plug in socket shown in FIGS. 7 and 7A.
Figure 7:
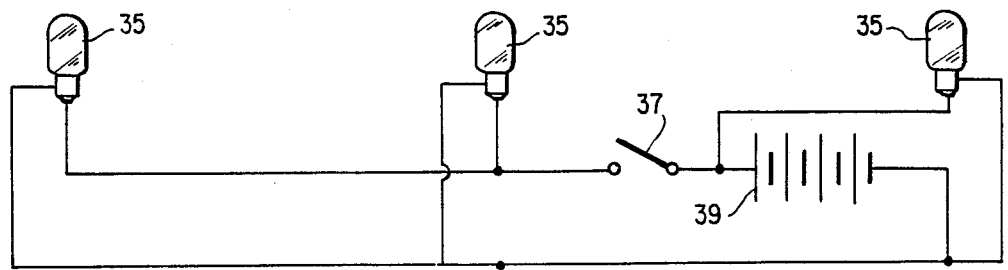
FIG. 7 is an electrical schematic of the illumination system of FIG. 8 with the casing being the commom ground

As best seen in FIGS. 4 and 5 the level unit 20 may be installed in a beam 41 having flat walls 42 and 43 at precisely 90° angles to each other, for correctly installing the unit 20 in the web of beam 41.

What I claim is:

1. For use with a leveling beam having a web and spaced apart parallel leveling flanges extending off said web at right angles thereto, a modular leveling box comprising four walls each at 90° to one another, the inside surfaces of said walls having a flat non-reflective white surface together with a white back wall and having an opening viewing front defining a viewing chamber, a cross bubble vial having a vertical and horizontal leg at 90° to each other disposed in said viewing chamber defined by said box, the legs of said vial being at 90° to each other and being disposed in said box with each leg parallel to their respective box walls adjacent the walls to which a leg is attached, said legs abutting said inside surfaces of said walls of said modular leveling box at 90°, said cross bubble vial being spaced from said while backwall of said modular leveling box, beam mount means for said box having a level measuring surface of a length greater than the length of said box to measure the level of planes having a length greater than the length of said modular box, and illumination means for maintaining the light level within the viewing chamber at a light level above ambient to take readings without glare or reflection from outside elements, 2. A level indicating device as claimed in claim 1 wherein said beam mount means is a beam of channel shape cross section wherein said modular box fits exactly between the spaced apart flanges of said channel shape.

3. A level indicating device as claimed in claim 1 wherein said beam mount means is a beam of I shape cross section, the web of which has a web opening therethrough to exactly receive and retain the modular box with the horizontal leg of the cross bubble vial exactly parallel to the web of said I beam.

* * * * *